Patented June 18, 1946

2,402,474

UNITED STATES PATENT OFFICE 2,402,474

COATING

Pierre van Dyck, Highland Park, and Charles B. Bradley, Middlesex, N. J., assignors to Johns-Manville Corporation, New York, N. Y., a corporation of New York No Drawing. Application August 29, 1944, Serial No. 551,782

3 Claims. (Cl. 72—127)

The instant invention relates to a protective coating composition and, more particularly, to a waterproofing coating for use on building structures, including masonry or concrete walls, such as parapet walls and the like, subject to penetration by moisture vapor.

The principal object of the invention is the provision of an improved coating composition or material which, while highly resistant to the penetration of water, readily permits the passage of moisture vapor. Preferred treatments heretofore employed for protective coatings on parapet walls and the like constructed of masonry, concrete and other relatively vapor-permeable materials, have comprised a relatively heavy bodied bitumen mastic or plastic, for example one composed of asphalt, asbestos fiber and mineral fillers. In some instances a plurality of coating layers are employed with a membrane, such as asphalt saturated felt, interposed between the layers. A treatment of this type is highly effective to prevent the passage of water to the wall surface. However, due to the imperviousness of the coatings to moisture vapor, any vapor which enters the porous wall structure from other sources and migrates to the waterproofed side cannot escape, with the result that the wall may become saturated with water. Spalling of the masonry material in freezing weather, and general deterioration of the wall results. The instant invention overcomes these disadvantages by providing a coating which will have similar waterproofing characteristics but, at the same time, have sufficient permeability to water vapor to permit the vapor to escape through the coating, thus preventing the collection of moisture within the wall.

Another object of the invention is the provision of a coating material of the type referred to above comprising a waterproofing material, preferably a bituminous material such as an asphalt emulsion, and a porous, vapor-permeable filler forming passageways for the escape of moisture vapor through the coating.

The coating of the instant invention is prepared by intermixing suitable quantities of the waterproofing material and the porous filler to provide substantially uniform distribution of the porous filler throughout the waterproofing. As indicated above, a bituminous emulsion, formed from water, colloidal clay or the like as an emulsifying agent, and asphalt or other suitable pitchy or bituminous material is preferably employed as the waterproofing material and as a carrier for the vapor-permeable material. In such emulsions the water forms the external and the asphalt the internal phases respectively. The materials which may be used for the internal phase include either natural or artificial asphalt or a prepared asphaltic cement, coal tar pitch, resin or the like.

The vapor-permeable filler employed in the preferred embodiment of the invention is exfoliated vermiculite in finely divided form. Exfoliated vermiculite is an alteration product of certain micaceous minerals, such as Zonolite or Biotite, which exfoliate or expand to many times their original size upon the application of heat to produce a granular material which is porous and extremely light. Such materials are prepared and marketed in different particle sizes for various uses. For the purposes of the instant invention the exfoliated vermiculite is preferably ground to have a particle size such as to pass a 28 mesh standard screen, and to be retained on a 60 mesh standard screen. In lieu of the exfoliated vermiculite, other finely ground materials having similar vapor-permeable or porous properties may be employed.

The finely ground vapor-permeable filler is intermixed with the waterproofing material such as the asphalt emulsion referred to above to be present, say, in a minimum amount of the order of 13% of the dry asphaltic content of the emulsion, the proportions being given by weight. As will be appreciated, the proportions of the materials employed may be varied substantially depending upon the specific conditions under which the coating is to be employed, the thickness of the coating to be applied, and the like. However, approximately 13% of the vapor-permeable filler by weight of the dry asphalt content, has been found to be satisfactory in most instances.

The coating, comprising the waterproofing carrier and the porous, vapor-permeable filler, may be used alone for brush or spray application, but preferably further ingredients are added to increase its consistency to such an extent as to make it suitable for trowel application. For example, the coating material may be readily modified to provide a mastic or plastic material which may be built up on the wall surface of the desired thickness. For this purpose a proportion of fibers, such as asbestos fibers, organic fibers or the like are included in the mixture, as well as additional fillers such as slate dust, carbon black, Portland cement and other like materials employed in conventional mastic coatings. For purposes of example, but without limiting the invention, a mastic material suitable for trowel application may comprise, say

| | Per cent |
|---|---|
| Asphalt | 18.5 |
| Asbestos fiber and other fillers such as slate dust and carbon black | 27.0 |
| Finely divided exfoliated vermiculite | 2.5 |
| Water | 52.0 |

A vapor-permeable, waterproofing mastic or plastic material as described above, is applied to the wall, for example a parapet wall, in a suitable thickness to provide a relatively permanent waterproofing, protective surface coating on the wall. Thus the material may be applied in a layer having a wet thickness of, say 1/4", which, upon evaporation of the water content, will shrink to have a dry thickness of say 1/8" to 3/16". The coating may be handled and applied in accordance with conventional practices.

The coating of the invention as described above, exhibits equivalent waterproofing properties to the coatings now conventionally employed and, due to the inclusion of the vapor-permeable material, additionally serves to permit the escape of moisture vapor which may be entrapped or confined within the porous structure of the wall, to prevent the accumulation of moisture therein with its attendant disadvantages. As a specific illustration of the novel properties of the coating as compared to those previously known, a treatment of the described conventional type will, when new, have a permeability to water vapor of about 0.4 grain per hr. per sq. ft. per in. of Hg vapor pressure differential. As a result, water vapor which gets into the wall cannot escape. Applicants' coating, on the other hand, when applied in a layer of similar thickness, provides a protective covering having a permeability to water vapor of about 8 grains per hr. per sq. ft. per in. of Hg vapor differential, thus permitting relatively rapid passage of moisture vapor therethrough. At the same time the covering is as effective as a waterproofing material as the known materials.

Having thus described our invention in rather full detail, it will be understood that these details need not be strictly adhered to but that various changes and modifications may suggest themselves to one skilled in the art, all falling within the scope of the invention as defined by the subjoined claims.

What we claim is:

1. In a building structure or the like comprising a vapor-permeable wall and a water-resistant coating on the surface thereof, said coating comprising a waterproofing bituminous material and a porous filler of the character of finely divided, exfoliated vermiculite.

2. In a building structure or the like comprising a vapor-permeable wall and a water-resistant coating applied thereto, said coating comprising a bituminous emulsion and finely divided, exfoliated vermiculite, the vermiculite being present in a minimum amount of the order of 13% by weight of the dry bituminous constituent of the emulsion, said coating having a dry thickness approximating 1/8 to 3/16" thickness.

3. In a building structure or the like comprising a vapor-permeable wall and a weather-resistant coating on the surface thereof, said coating comprising a bituminous emulsion and finely divided, exfoliated vermiculite of a particle size of the order of that which will pass a 28 mesh screen and will be retained on a 60 mesh screen, the vermiculite being present in a minimum amount of the order of 13% by weight of the dry bituminous constituent of the emulsion.

PIERRE VAN DYCK.
CHARLES B. BRADLEY.